United States Patent
Hui (10) Patent No.: US 10,570,310 B2
(45) Date of Patent: Feb. 25, 2020

(54) OPTICAL ARTICLE COMPRISING A HARD COAT, AND PRODUCTION METHOD

(71) Applicant: Essilor International, Charenton le Pont (FR)

(72) Inventor: Yu Hui, Singapore (SG)

(73) Assignee: Essilor International, Charenton le Pont (FR)

( * ) Notice: Subject to any disclaimer, the term of this patent is extended or adjusted under 35 U.S.C. 154(b) by 663 days.

(21) Appl. No.: 15/118,419

(22) PCT Filed: Feb. 11, 2015

(86) PCT No.: PCT/EP2015/052880
§ 371 (c)(1),
(2) Date: Aug. 11, 2016

(87) PCT Pub. No.: WO2015/121305
PCT Pub. Date: Aug. 20, 2015

(65) Prior Publication Data
US 2017/0174934 A1 Jun. 22, 2017

(30) Foreign Application Priority Data
Feb. 12, 2014 (EP) .................................... 14305184

(51) Int. Cl.
| | | |
|---|---|---|
| C09D 167/04 | (2006.01) | |
| C09D 7/40 | (2018.01) | |
| C08J 7/04 | (2020.01) | |
| G02B 1/14 | (2015.01) | |
| C09D 201/00 | (2006.01) | |
| C09D 5/00 | (2006.01) | |
| C09D 7/65 | (2018.01) | |
| C08L 101/00 | (2006.01) | |
| G02B 1/04 | (2006.01) | |
| C09D 183/06 | (2006.01) | |
| C09D 183/04 | (2006.01) | |

(52) U.S. Cl.
CPC ............ *C09D 167/04* (2013.01); *C08J 7/047* (2013.01); *C08L 101/005* (2013.01); *C09D 5/006* (2013.01); *C09D 7/40* (2018.01); *C09D 7/65* (2018.01); *C09D 201/005* (2013.01); *G02B 1/041* (2013.01); *G02B 1/14* (2015.01); *C08J 2333/10* (2013.01); *C08J 2400/202* (2013.01); *C08J 2467/04* (2013.01); *C09D 183/04* (2013.01); *C09D 183/06* (2013.01)

(58) Field of Classification Search
CPC ............................. C09D 183/04; C09D 183/06
See application file for complete search history.

(56) References Cited

U.S. PATENT DOCUMENTS

| | | | | |
|---|---|---|---|---|
| 5,997,954 A | * | 12/1999 | Decker ................. | C08G 77/54 427/387 |
| 2007/0066766 A1 | * | 3/2007 | Chen ................... | C08G 63/695 525/446 |
| 2008/0160289 A1 | * | 7/2008 | Lin ........................ | B82Y 30/00 428/327 |
| 2010/0048745 A1 | * | 2/2010 | Yamada .................... | C08J 9/26 521/61 |

FOREIGN PATENT DOCUMENTS

| | | | |
|---|---|---|---|
| JP | 2009-227801 A | | 10/2009 |
| JP | 2012-172001 | * | 9/2012 |
| JP | 2012172001 A | * | 9/2012 |

OTHER PUBLICATIONS

Machine translation, JP 2012172001 (Year: 2012).*
English language translation JP 2001-033117 (Year: 2011).*
International Search Report dated Apr. 8, 2015, in PCT/EP2015/052880 filed Feb. 11, 2015.

* cited by examiner

*Primary Examiner* — Margaret G Moore
(74) *Attorney, Agent, or Firm* — Oblon, McClelland, Maier & Neustadt, L.L.P.

(57) ABSTRACT

A sol-gel composition for acrylic polymers-based substrate including at least a silane hydrolysate and at least an adhesion promoter including a dendritic polymer having hydroxyl and alkoxysilane groups at terminal ends thereof. An optical article coated with said sol-gel composition.

20 Claims, 1 Drawing Sheet

Fig.1

Fig.2

OPTICAL ARTICLE COMPRISING A HARD COAT, AND PRODUCTION METHOD

CROSS-REFERENCE TO RELATED APPLICATIONS

This application is a National Stage of PCT/EP2015/052880, which was filed on Feb. 11, 2015. This application is based upon and claims the benefit of priority to European Application No. 14305184.5, which was filed on Feb. 12, 2014.

BACKGROUND OF THE INVENTION

1. Field of the Invention

The present invention generally relates to an optical article, especially an ophthalmic lens, having a fringe-free monolayer hardcoat on acrylic substrate, as well as to a method for making such an optical article.

In particular, the present invention relates to an optical article wherein the fringe-free monolayer hardcoat on acrylic substrate is prepared by using a specific dendrimer.

2. Description of Related Art

Acrylic polymers are widely used as substrate for optical devices. This kind of substrate are generally based on polymerized (meth)acrylic acid and esters thereof and presents typically a refractive index of around 1.6 at a reference wavelength of 550 nm and expressed at 25° C.

It is known to protect against abrasion and scratches the surfaces of (meth)acrylic polymers-based substrate, by means of hard coatings (abrasion-resistant and/or scratch-resistant coatings) which are typically based on a polysiloxane.

However, it is always difficult to obtain a good adhesion between the (meth)acrylic polymers-based substrate and the abrasion-resistant hard coating.

To enhance adhesion between the substrate and the hard coat, it has been suggested to use a hard coat comprising at least two layers: a first layer, known as primer layer, intended to be deposited on the substrate and a second layer having abrasion-resistant and/or scratch-resistant properties, which is coated on this first primer layer. Hence, the primer layer provides improved adhesion of the hard coat on the substrate.

It should therefore be appreciated to provide a new hard coat composition, which enables to simplify the manufacturing process (less preparation steps, more cost effective process) of an optical article comprising (meth)acrylic polymer-based substrate coated with a hard coat layer, while allowing a good adhesion with said (meth)acrylic polymers-based substrate.

In addition, it is known that the difference in refractive index between the (meth)acrylic polymers-based substrate and the hard coat layer should be as small as possible to limit apparition of fringes due to light reflection and interferences. Fringes are indeed considered as cosmetic defects on the optical article, especially on eyeglasses.

Therefore, it is also desirable to provide a new hard coat composition which prevents the formation of cosmetic defects on the final optical article. In particular, it is desirable to provide a new hard coat composition having a refractive index which is closer to that of the (meth)acrylic polymers-based substrate.

Although the hard coat compositions having a high refractive index, for instance of about 1.6, described in the prior art provide an acceptable adhesion with (meth)acrylic polymers-based substrate, or less visible fringes, they are, however, not fully satisfactory.

Indeed, a unique hard coat composition having improved adhesion, mechanical properties on (meth)acrylic polymers-based substrate, while preventing fringes formation is highly desirable.

SUMMARY OF THE INVENTION

Therefore, a first object of the present invention is to provide a novel hard coat composition which avoids at least the drawbacks of the prior art hard coat compositions, especially which is capable of imparting good adhesion onto a (meth)acrylic polymers-based substrate without forming cosmetic defects (fringes), while having good abrasion-resistant and/or scratch-resistant properties.

A second object of the invention is to provide a novel hard coat composition, which enables also to obtain hard coat layer having a low haze along with very good adhesion properties to the underlying (meth)acrylic polymers-based substrate and very good mechanical properties, such as scratch resistance and abrasion resistance.

An other object is to provide a process of preparation of an optical article comprising such hard coat composition and which is simpler and more cost effective than the known processes of the prior art which necessitate the use of a primer layer so as to improve the adhesion between the hard coat composition and the substrate.

To achieve the foregoing objects, there is provided a sol-gel composition forming upon cure a coating for (meth)acrylic polymers-based substrate comprising at least a silane hydrolysate and at least an adhesion promoter, characterized in that said adhesion promoter comprises a dendritic polymer having hydroxyl and alkoxysilane groups at terminal ends thereof.

Said alkoxysilane groups at terminal ends of the dendritic polymer may be obtained by grafting on the dendrictic polymers with a coupling agent selected from alkoxysilanes having at least one functional group selected from: isocyanate (NCO), carboxylic acid and carboxylic acid derivatives such as carboxylic chloride, carboxylic bromide or carboxylic anhydride, or mixtures thereof Due to its properties, the sol-gel composition enables to solve the drawbacks of the prior art composition, and enables especially to obtain upon curing a unique hard coat coating with enhanced adhesion and mechanical properties especially on (meth)acrylic polymers-based substrate, while having low haze and few and/or no cosmetics defects (fringes).

The invention also relates to an optical article having at least one surface comprising a coating obtained by depositing on a substrate either directly or after a surface treatment of the substrate, and curing a sol-gel composition according to the invention.

The invention also relates to a process of preparation of an optical article obtained by depositing on a substrate and curing a sol-gel composition according to the invention, which comprises the following steps:

(a) preparing at least a silane hydrolysate as defined above;
(b) preparing an adhesion promoter as defined above;
(c) mixing said at least silane hydrolysate with said adhesion promoter so as to obtain the sol-gel composition;
(d) coating the substrate with said sol-gel composition; and
(e) curing said sol-gel composition.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values « from X to Y» or "between X to Y", according to the present invention, means as including the values of X and Y.

When the optical article comprises one or more surface coatings, the term "to deposit a layer onto the optical article" means that a layer is deposited onto the outermost coating of the optical article, i.e. the coating which is the closest to the air.

The outer layer in a coating stack is the layer that is the closest to the air, before deposition of another coating(s).

A coating that is "on" a side of a lens is defined as a coating that (a) is positioned over that side, (b) need not be in contact with that side, i.e., one or more intervening coatings may be disposed between that side and the coating in question, and (c) need not cover that side completely.

"Sol-gel" methods and compositions are known by the man skilled in the art. The term "sol-gel" refers to materials undergoing a series of reactions, including hydrolysis and condensation and going through the sol to gel transition. Typically, a metal compound, such as a metal alkoxide or metal salt, hydrolyzes to form a metal hydroxide. The metal hydroxides then condense in solution to form a hybrid organic/inorganic polymer. Under certain conditions, these polymers condense to form a network gel.

The optical article prepared according to the present invention is generally a transparent optical article, preferably a lens or lens blank, and more preferably an ophthalmic lens which may be an afocal, a unifocal, a bifocal, a trifocal or a progressive ophthalmic lens. The optical article may be coated on its convex main face (front side), concave main face (back side), or both faces with the anti-abrasion coating according to the invention.

As previously mentioned, the present invention relates to a sol-gel composition, preferably a sol-gel composition forming upon cure an antiabrasion coating, for (meth)acrylic polymers-based substrate comprising at least a silane hydrolysate and at least an adhesion promoter, characterized in that said adhesion promoter comprises a dendritic polymer having hydroxyl and alkoxysilane groups at terminal ends thereof.

For instance, said hydroxyl groups of the dendritic polymer are partly grafted with a coupling agent selected from alkoxysilanes comprising at least one functional group capable to react with the hydroxyl groups of the dendrictic polymers.

The applicant has surprisingly discovered that the sol-gel composition according to the invention is capable of imparting good adhesion onto an (meth)acrylic polymers-based substrate without forming cosmetic defects and/or fringes.

In particular, the sol-gel composition according to the invention enables to obtain hard coat layer having a low haze along with very good adhesion properties to an underlying substrate, preferably made of (meth)acrylic polymers known as high index material in the ophthalmic industry having a refractive index of about 1.6 and very good mechanical properties, such as scratch resistance and abrasion resistance.

Thus, there is no need to use a primer layer to allow the adhesion between an underlying (meth)acrylic polymer-based substrate and an anti-abrasion coating; the anti-abrasion coating obtained upon cure from the sol-gel composition of the invention acts both as a primer layer and as an anti-abrasion layer.

According to the invention, the sol-gel composition for (meth)acrylic polymers-based substrate of the invention comprises at least:
(i) a hard coat solution (i) comprising at least a silane hydrolysate having anti-abrasion and/or anti-scratching properties and
(ii) an adhesion promoter (ii).

Examples of such (i) hard coat solution based on silane hydrolysate are described in U.S. Pat. No. 4,211,823 or US 2003/0165698.

For instance, a hard coat solution (i) able to provide hardenable abrasion resistant coating comprises the following constituents:
A—a silane hydrolysate containing an epoxy group and three alkoxy groups, the latter groups being directly bonded to the silicon atom,
B—optionally, a silane hydrolysate having formula (I):

where $T^1$ and $T^2$ are groups which will each react to give a OH group on hydrolysis of the silane of formula (I), $Z^1$ and

$Z^2$ are organic groups bonded to the silicon atom by a Si—C bond which do not contain a group capable of reacting with the hydrolysed silanes present in the composition;

C—optionally, colloidal particles of inorganic oxide, such as silicon oxide, titanium oxide, zirconium oxide, tantalum oxide, aluminum oxide, tin oxide, tungsten oxide or a mixture thereof;

D—optionally, an aluminum compound;

E—and when the aluminum compound is aluminum chelate, the hard coat solution preferably comprises an organic solvent whose boiling point T at atmospheric pressure is between 70° C. and 140° C.

In an embodiment of the invention, constituent A of the composition is a hydrolysate of an epoxysilane having formula (V):

wherein: $R^1$ is an alkyl group with 1 to 6 carbon atoms, preferably a methyl or ethyl group, $R^2$ is a methyl group or a hydrogen atom, a is a whole number from 1 to 6, b is 0, 1 or 2.

The following are examples of such epoxysilanes: [gamma]-glycidoxypropyltrimethoxysilane, [gamma]-glycidoxypropyltriethoxysilane, glycidoxy methyl trimethoxysilane, glycidoxy methyl triethoxysilane, glycidoxy methyl tripropoxysilane, alpha-glycidoxy ethyl trimethoxysilane, alpha-glycidoxy ethyl triethoxysilane, beta-glycidoxy ethyl trimethoxysilane, beta-glycidoxy ethyl triethoxysilane, beta-glycidoxy ethyl tripropoxysilane, alpha-glycidoxy propyl trimethoxysilane, alpha-glycidoxy propyl triethoxysilane, alpha-glycidoxy propyl tripropoxysilane, beta-glycidoxy propyl trimethoxysilane, beta-glycidoxy propyl triethoxysilane, beta-glycidoxy propyl tripropoxysilane, gamma-glycidoxy propyl trimethoxysilane, gamma-glycidoxy propyl triethoxysilane, gamma-glycidoxy propyl tripropoxysilane, 2-(3,4-epoxycyclohexyl)ethyltrimethoxysilane, 2-(3,4-epoxycyclohexyl)ethyltriethoxysilane or a mixture thereof.

Preferably, gamma-glycidoxy propyl trimethoxysilane, gamma-glycidoxy propyl triméthoxysilane, 2-(3,4-epoxycyclohexyl)ethyltrimethoxysilane, 2-(3,4-epoxycyclohexyl)ethyltriethoxysilane and [gamma]-glycidoxypropyltrimethoxysilane (GLYMO®) are used.

The constituent B, in combination with constituent A, enables to reduce the rigidity of the final coating obtained and increases the shock resistance of the corresponding coated lens, while maintaining good abrasion resistance.

Constituent B is produced from the silane of formula (I) where each of the two groups $T^1$ and $T^2$ bonded to the silicon is hydrolyzed to a hydroxy group so that the hydrolysed silane of formula (I) is a disilanol.

$T^1$ and $T^2$ are independently selected from, for example, chlorine, hydrogen and acyloxy groups or, preferably, alkoxy groups with 1 to 10 carbon atoms.

Groups $Z^1$ and $Z^2$ in the silane of formula (I) preferably do not contain a group which can react with functional groups held by the hydrolyzed silanes present in the composition, especially with silanol (SiOH) groups or bridging groups containing epoxy groups.

$Z^1$ and $Z^2$ are preferably selected independently of each other from alkyl groups with 1 to 10 carbon atoms or aryl groups with 6 to 10 carbon atoms, such as the phenyl group.

Examples of silanes of formula (I) are: dimethyldimethoxysilane, dimethyldiethoxysilane and methylphenyldimethoxysilane.

Silane hydrolysates are prepared using known methods. The techniques described in U.S. Pat. No. 4,211,823 can be employed. It is possible, for example, to mix the silanes and then hydrolyze the mixture.

It is preferable to use a stoichiometric amount of water for the hydrolysis, i.e. a molar quantity of water which corresponds to the number of moles of the groups which can produce silanols (for example Si—O-Alkyl, Si—Cl, Si—H).

Constituent C of the composition is colloidal particles of inorganic oxides, i.e. for instance fine particles of silicon oxide, titanium oxide, zirconium oxide, tantalum oxide, aluminum oxide, tin oxide, tungsten oxide or mixtures thereof with a diameter of preferably less than 50 µL in dispersion in a solvent, preferably an alcohol type solvent.

An example of such a colloidal silica is Nissan Sun Colloid Mast which contains 30% of solid $SiO_2$ in suspension in methanol and examples of such colloidal titanium/silicium/zirconium/tin oxide are ESS-2 or 1120Z (both from JGC) which contains 20% of solids in suspension in methanol.

Constituent D is an aluminum compound which acts as the hardening catalyst for the composition. It is preferably selected from aluminum chelates, aluminum alkoxylates or mixtures thereof.

An aluminum chelate is a compound formed by reacting an aluminum alcoholate or acylate with nitrogen- and sulphur-free sequestrating agents, which contain oxygen as the coordinating atom.

The aluminum chelate is preferably selected from aluminium acetylacetonate, aluminium ethylacetoacetate bisacetylacetonate, aluminium bisethylacetoacetate acetylacetonate, aluminium di-n-butoxide monoethylacetoacetate and aluminium diisopropoxide monomethylacetoacetate.

Constituent D is used in proportions which will harden the compositions of the invention over a period of a few hours at temperatures in the order of 100° C.

It is generally used in a proportion of 0.1% to 5% by weight of the total weight of A to E compounds.

When constituent D is an aluminum chelate the composition preferably comprises a constituent E which is an organic solvent whose boiling point T at atmospheric pressure is between 70° C. and 140° C.

Ethanol, isopropanol, ethyl acetate, methylethylketone or tetrahydropyrane can be used as constituent E.

The hard coat solution (i) based on silane hydrolysate in accordance with the invention can also comprise other organic solvents (apart from constituent E), preferably alcohol type solvents such as methanol, which serve to adjust the viscosity of the composition.

The following proportions by weight relative to the total weight of (i) the hard coat solution based on silane hydrolysate (compounds A to E) are used for the composition constituents:

130 to 230 parts of constituent A,
20 to 150 parts of constituent B, when present
30 to 800 parts of constituent C, preferentially 200 to 800 parts,
5 to 20 parts of constituent D,
20 to 50 parts of constituent E, when present.

The hard coat solution compositions in accordance with the invention which have the best properties are those containing at least 30%, preferably in the order of 50%, of solid material ($SiO_2$ or $TiO_2$) from constituent C in the theoretical dry content.

The expression "weight of solid material from constituents A or B" means the calculated weight of unit QkSiO(4−k)/2 where Q is an organic group which is directly handed to a silicon atom by a Si—C bond and QkSiO(4−k)/2 comes from QkSiR'''(4−k) where Si—R''' reacts to form SiOH upon hydrolysis and k is 0, 1 or 2.

The expression weight of solid material from constituent C" means the weight of inorganic particles, such as $SiO_2$ or $TiO_2$.

The theoretical dry content (TDC) is the total calculated weight of solid material from constituents A, B and C, with the addition of the weight of constituent D.

The hard coat solutions (i) based on silane hydrolysate of the invention preferably comprise at least 1% by weight of water.

The water can be the result of incomplete hydrolysis of the starting silanes or of the condensation reaction of the silanols formed during the hydrolysis.

The water can also be added to the composition either directly or by means of the organic solvents which contain a certain percentage of water.

The hard coat solutions (i) based on silane hydrolysate can also include various additives, such as surfactants to improve spreading of the composition over the surface to be coated, UV absorbers or pigments.

The above described hard coat solutions (i) based on at least a silane hydrolysate provide an appropriate network for the adhesion promoter (ii) according to the invention.

According to the invention, the adhesion promoter (ii) comprises a dendritic polymer chemically grafted with a particular coupling agent.

Herein, "dendritic polymers" include dendrimers which have completely branched star-like topologies and hyperbranched polymers which have imperfectly branched or irregular structures.

Figure 1:
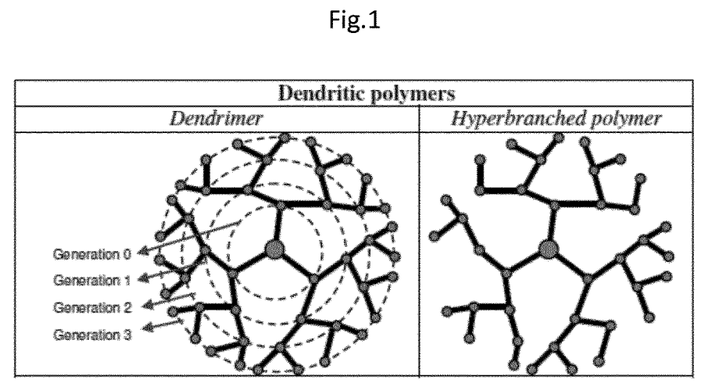
FIG. 1 is a schematic representation of dendrimers and hyperbranched polymers.

Both dendrimer and hyperbranched polymer molecules are composed of repeating units emanating from a central core. The core is characterized by its functionality, which is the number of chemical bonds through which it can be connected to the external parts of the molecule. The functionality of the core is normally three or four. Through the bonds of the core, the layers of linear units (single monomers or linear chains) are attached to the core and each of these arms is terminated with the multifunctional branched unit. Larger molecules are created by adding shells of linear units to the end groups of the layer beneath. If all of these units are attached to the molecule perfectly, a dendrimer is formed. In contrast, the absence of any of these units in the molecule will result in a hyperbranched polymer structure. A schematic representation of dendrimers and hyperbranched polymers is presented in FIG. 1.

Generally, dendritic polymers of the invention have hydroxyl group at terminal ends thereof. Indeed, dendritic polymers containing amino or amino groups are not suitable for ophthalmic coatings, as they tends to degrade upon UV exposition and may bring a yellow color to the coating.

According to a first characteristic of the invention, the dendritic polymer may have any degree of functionality, but it is presently preferred that it be from about 5 to about 60, in particular from about 10 to about 32, typically from 15 to 20 and better of about 16.

As used herein, "functional" and "functionality" refer to the type and number of the indicated functional group available on a multifunctional molecule for reaction with reagents that typically react with such groups. For instance, with regard to dendritic polymers, it refers to the number of functional groups available on the $n^{th}$ generation of the polymer. Thus, for example without limitation, a dendritic polymer that has a functionality of 16 would be understood to have 16 free groups, such as hydroxyl or alkoxysilane groups, on the outer "surface" of the polymer. Said free groups are available for further polymerization with a crosslinker.

According to a second characteristic of the invention, the dendritic polymer has a number average molar mass Mn ranging from 1000 to 15000 g/mol, preferably ranging from 2000 to 12000 g/mol, in particular from 3000 to 5000 g/mol, and ideally of about 3750 g/mol.

In particular, dendritic polymer is a dendritic polyester or polyether.

Advantageously, the dendritic polymer has branching units which are selected from 2,2-bis(methylol)propionic acid, 2,2-bis(methylol)butanoic acid or mixtures thereof.

According to the invention, the dendritic polymer is obtained by partly grafting a coupling agent selected from alkoxysilanes comprising at least one functional group capable to react with the hydroxyl groups of a precursor dendritic polymer. The functionalization ratio of the dendritic polymer is defined as the number of hydroxyl terminal groups divided by the number of alkoxysilane terminal groups.

Preferably, the at least one functional group of the coupling agent is selected from: isocyanate (NCO), carboxylic acid and carboxylic acid derivatives such as carboxylic chloride, carboxylic bromide or carboxylic anhydride, or mixtures thereof.

Examples of coupling agents of the invention are 3-(Triethoxysilyl)propyl isocyanate (3-isocyanatopropyltriethoxysilane, IPTEOS), 3-(Triethoxysilyl)propanoyl chloride.

For instance, dendritic polymers comprised in adhesion promoter of the invention may be obtained by partly grafting precursor dendritic polymers having only hydroxyl groups commercially available from Perstorp under the trade name Boltorn H20®, Boltorn H30®, Boltorn H40® or mixture thereof.

Figure 2:
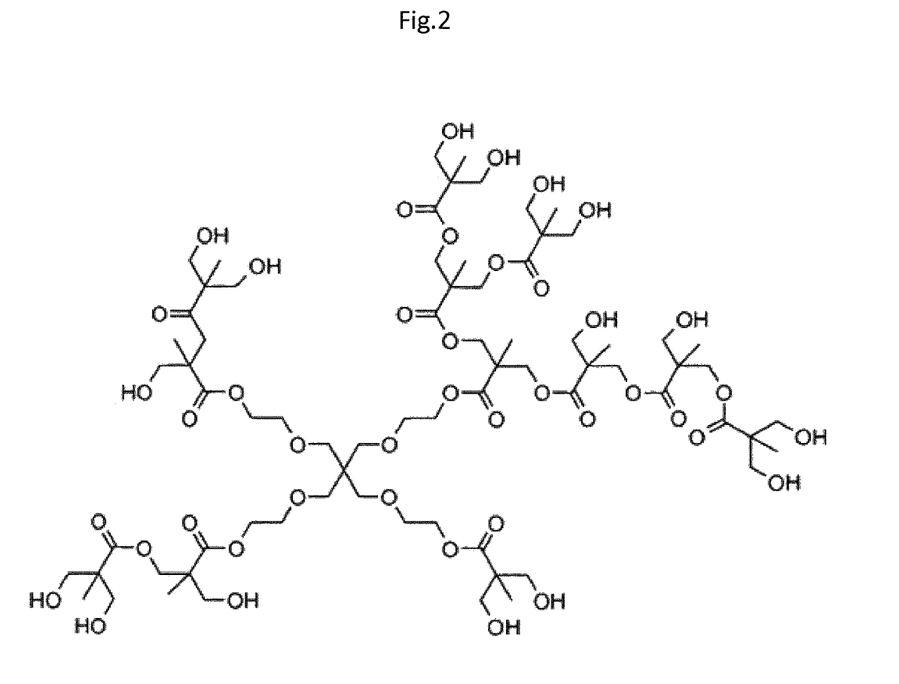
FIG. 2 illustrates the structure of a dendric polymer of the present disclosure.

Especially, dendritic polymer of the invention may be obtained by partly grafting a hyperbranched polyester having 2,2-bis(methylol)propionic acid (bis-MPA) branching units available under the trade name Boltorn H20® and having the structure represented in FIG. 2.

Indeed, the applicant has discovered that when the dendritic polymer has no OH terminal groups (functionalization ratio of 0), the adhesion of the obtained coating onto the (meth)acrylic polymers-based substrate is not satisfactory. Also, when less than 25% of all terminal groups of the dendritic polymer are alkoxysilane (functionalization ratio larger than 3), the adhesion is not good.

Without being bound by any theory, the applicant founds that a high crosslinking of the modified dendritic polymer (ratio larger than 2.5) would block the penetration of the sol-gel network into said modified dendritic polymer; whereas a low crosslinking of the modified dendritic polymer (ratio lower than 0.4) would not be sufficient to allow a good adhesion with acrylic substrates.

On the contrary, a functionalization ratio ranging from 0.4 to 2.5 enables to obtain an adhesion promoter having good adhesion with the underlaying (meth)acrylic polymers-based substrate, good flexibility and also good mechanical properties.

A dendritic polymer according to the invention, using Boltorn H20® grafted with IPTEOS with a functionalization ratio of about 1 would have has a number average molar mass Mn of about 3750 g/mol.

Preferably, the content of the adhesion promoter, by weight (dry extract), relative the total weight of the sol-gel forming coating anti-abrasion composition (dry extract) is ranging from 1 to 15%, preferably from 2 to 10%, better from 3 to 8%, and ideally is of about 5%.

It has been found that the dendritic polymers increase the anti-abrasion and/or anti-scratching properties of the hard coat solution (i) based on silane hydrolysate. This mechanical properties would be obtained because of high chemical crosslinking and topological interpenetration with sol-gel matrix and good compatibility with (meth)acrylic substrates. When non-alkoxysilanated dendritic polymer was used in the hard coat solution, adhesion was poor due to the absence of crosslinking with the sol-gel network.

Articles obtained according to the invention will be described in more details.

The present invention provides an optical article having at least one surface comprising a coating obtained by directly depositing on a substrate a sol-gel forming coating composition as defined above and curing sol-gel composition.

Preferably, the coating is a monolayer, which does not comprise hence a primer layer.

In particular, said coating has a refractive index ranging from 1.55 to 1.65, ideally of 1.60.

The substrate may be made of organic glass, preferably organic glass (polymer substrate).

Organic glasses can be made of any material currently used for organic ophthalmic lenses and especially thermosetting materials known as acrylic substrates with a refractive index ranging from 1.55 to 1.65, ideally of 1.60.

Such substrates may be obtained by polymerization of mixtures of monomers having acrylic or methacrylic groups and optionally allyl monomers or aromatic vinyl.

(Meth)acrylates may be monofunctional (meth)acrylates or multifunctional (meth)acrylates bearing from 2 to 6 (meth)acrylic groups or mixtures thereof. Without limitation, (meth)acrylate monomers are selected from:
  alkyl (meth)acrylates, in particular
    (meth)acrylates derived from adamantine, norbornene, isobornene, cyclopentadiene or dicyclopentadiene,
    C1-C4 alkyl (meth)acrylates such as methyl (meth)acrylate and ethyl (meth)acrylate,
  aromatic (meth)acrylates such as benzyl (meth)acrylate, phenoxy (meth)acrylates or fluorene (meth)acrylates
  (meth)acrylates derived from bisphenol, especially bisphenol-A
  polyalkoxylated aromatic (meth)acrylates such as the polyethoxylated bisphenolate di(meth)acrylates, polyethoxylated phenol (meth)acrylates,
  polythio(meth)acrylates,
  product of esterification of alkyl (meth)acrylic acids with polyols or epoxies.

(Meth)acrylates may be further functionalized, especially with halogen substituants, epoxy, thioepoxy, hydroxyl, thiol, sulphide, carbonate, urethane or isocyanate function.

Allyl monomers may be optionally used. Without limitations, allyl monomers may be selected from:
  allyl carbonates of
    linear aliphatic polyols, such as diethylene glycol bis(allyl carbonate),
    branched aliphatic polyols,
    aromatic polyols, such as isopropylene bisphenol-A bis(allyl carbonate)
  allyl esters of phtalic acid or bisphenol A Aromatic vinyl monomers may be optionally used. Without limitations, vinyl monomers may be selected from styrene, divinylbenzene or diisopropenylbenzene.

Copolymers of epoxyacrylates and styrene; or copolymers of halogenated bisphenol A diacrylate and styrene; or copolymers of acrylic acid, epoxidized bisphenol A, halogenated bisphenol A diacrylate and styrene, such as KOC 60S (from KOC) or LS160AM (from Miwon) may be used.

The substrates may obviously be obtained by polymerizing mixtures of the above monomers. By (co)polymer, it is meant a copolymer or polymer. By (meth)acrylate, it is meant an acrylate or methacrylate.

Particularly recommended substrates are acrylic substrates having refractive index about 1.6.

The optical element is selected from ophthalmic lens, ocular visor, and sight optical systems. Especially, ophthalmic lens can be an uncorrective (also called plano or afocal lens) or corrective ophthalmic lens. Corrective lens may be a unifocal, a bifocal, a trifocal or a progressive lens.

The surface of the article onto which the sol-gel composition of the invention is directly deposited, may optionally be subjected to a physical or chemical pre-treatment step intended to improve adhesion, for example a high-frequency discharge plasma treatment, a glow discharge plasma treatment, a corona treatment, an electron beam treatment, an ion beam treatment, a solvent treatment or an acid or base (NaOH) treatment.

According to a characteristic of the invention, the sol-gel composition is directly deposited onto a substrate in a manner such that, after curing, it forms an anti-abrasion coating having a thickness of 1 micrometer or more, preferably from 2 to 5 micrometers, more preferably from 2.5 to 4 micrometers.

In addition, a mono or multilayer antireflective coating comprising an outer layer may optionally be directly deposited over said anti-abrasion coating.

Anti-reflection (AR) coatings and their methods of making are well known in the art and are disclosed in US20080206470. The AR coating of the present invention may include any layer or stack of layers which improves the anti-reflective properties of the finished optical article over at least one portion of the visible spectrum, thereby increasing the transmission of light and reducing surface reflectance at the article-air interface.

Preferably, the total physical thickness of the AR coating is lower than 1 micrometer, more preferably lower than or equal to 500 nm. The total physical thickness of the anti-reflection coating is generally higher than 100 nm, preferably higher than 150 nm.

According to a specific embodiment, an anti-fouling top coat may be deposited over said outer layer of said AR coating.

The anti-fouling top coat is defined as a hydrophobic and/or oleophobic surface coating. The ones preferably used in this invention are those which reduce surface energy of the article to less than 20 mJ/m$^2$. The invention has a particular interest when using anti-fouling top coats having a surface energy of less than 14 mJ/m$^2$ and even better less than 12 mJ/m$^2$.

The surface energy values referred above are calculated according to Owens Wendt method, described in the following document: Owens, D. K.; Wendt, R. G. "Estimation of the surface force energy of polymers", J. Appl. Polym. Sci. 1969, 51, 1741-1747.

Generally, the deposited anti-fouling top coat has a physical thickness lower than 30 nm, preferably ranging from 1 to 20 nm, more preferably ranging from 1 to 10 nm, and even better from 1 to 5 nm. Control of the deposited thickness can be performed by means of a quartz scale.

The article thus obtained exhibit ultra hydrophobic properties along with abrasion resistance.

Whatever the embodiment of the present invention, the anti-abrasion coating of the invention shows many advantages compared to other anti-abrasion coating systems, including
1) It may be processed simply and at low temperature (~100° C.) process;
2) It is directly applicable to acrylic polymers-based substrates with excellent adhesion;
3) It has excellent abrasion resistance
4) it allows flexible process to make other functional coatings;

The curable anti-abrasion coating coating has specific applications in the optical lens industry, especially for ophthalmic lens such as eyeglass lenses.

In some embodiment, the final optical articles do not absorb light in the visible range (or little), which means herein that when coated on one side according to the inventive process, the optical article has a luminous absorption in the visible range due to the anti reflecting (AR) and/or a relative light transmission factor in the visible spectrum, Tv, preferably higher than 85%, in particular 88%, ideally 90%, more preferably higher than 95%, and even more preferably higher than 96%. Preferably, both features are simultaneously satisfied and can be reached by carefully controlling thicknesses of the coatings.

As used herein, the Tv factor is such as defined in the standard NF EN 1836 and corresponds to the 380-780 nm wavelength range.

In an alternative embodiment, the optical article may be tinted or dyed and absorb light in the visible range.

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably less than 0.8%, and more preferably less than 0.5%.

The present invention also relates to a process of preparation of an optical article coated with the sol-gel composition of the invention, which is obtained by the following step:
(a) preparing at least a silane hydrolysate as defined above;
(b) preparing an adhesion promoter as defined above;
(c) mixing said at least silane hydrolysate with said adhesion promoter so as to obtain a sol-gel composition;
(d) coating the substrate with said sol-gel composition; and
(e) curing said sol-gel forming composition and obtaining a coating having preferably anti-abrasion properties.

In particular, step (b) consisting in preparing of a sol-gel composition as defined above, comprises the successive followings step:
dissolving at least one dendritic polymer having hydroxyl groups at terminal ends thereof in a solvent so as to obtain a mixture;
adding under stirring, to the above mixture, a coupling agent selected from alkoxysilanes comprising at least one functional group capable to react with the hydroxyl groups of the dendritic polymers;
optionally, adding to the mixture a catalyst
obtaining the adhesion promoter by precipitation and/or extraction.

The anti-abrasion coating is formed at the surface of the substrate by liquid phase deposition according to any appropriate method, starting from the above described (liquid) sol-gel composition.

Application of said composition may be carried out, without limitation, by spin coating, dip coating, spray coating, brush coating, roller coating. Spin coating and dip coating are preferred.

Thus, the process of preparation of the anti-abrasion coating of the invention is simpler and more cost effective process than the known process of the prior art which necessitates the use of a primer layer so as to improve the adhesion between the hard coat composition and the substrate.

Hence, there is no need to use a primer layer to allow the adhesion between an underlying acrylic polymer-based substrate and an anti-abrasion coating; the anti-abrasion coating obtained from the sol-gel forming coating anti-abrasion composition of the invention acts both as a primer layer and as an anti-abrasion layer.

Now, the present invention will be described in more detail with reference to the following examples. These examples are provided only for illustrating the present invention and should not be construed as limiting the scope and spirit of the present invention

EXAMPLES

1. Testing Methods

The following test procedures were used to evaluate the optical articles prepared according to the present invention.

a) Haze Value

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's instructions. Next, the sample was placed on the transmission light beam of the pre-calibrated meter and the haze value was recorded from three different specimen locations and averaged.

b) Transmittance (Tv)

Tv was measured using the same device as the haze value measurement.

"Luminous transmittance" or "relative light transmission factor in the visible spectrum" Tv (or $\zeta v$) is also defined in the standard ISO 13666:1998 and is measured according to the standard ISO 8980-3 (from 380 to 780 nm).

c) Yellow Index

Yellow Index is measured according to ASTM D-1925. Yl can be determined from the CIE tristimulus values X, Y, Z through the relation: Yi=128 X−106 Z/Y.

d) Sand Bayer Abrasion Test (with Alumine) (Will be Referred as ISTM Bayer):

Bayer abrasion resistance is determined by measuring the percent haze of a coated and uncoated lens, before and after testing on an oscillating sand abrader as in ASTM F 735-81 The abrader is oscillated for 300 cycles with approximately 500 g of aluminum oxide ($Al_2O_3$) ZF 152412 supplied by Specially Ceramic Grains (former Norton Materials) New Bond Street, PO Box 15137 Worcester, Mass. 01615-00137. The haze is measured using a Pacific Scientific Hazemeter model XL-211. The ratio of the uncoated lens haze (final-initial) is a measure of the performance of the coating, with a higher ratio meaning a higher abrasion resistance.

e) Cross Hatch

Crosshatch adhesion test is done according to standard ISTM 02-010. According to crosshatch test ISTM 02-010, a mark from 0 to 5 is given to the lens. With mark 0 or 1, the lens is acceptable (passes), whereas marks 2 to 5 are not acceptable (does not pass).

f) Scratch-Resistance: Hand Steel Wool Test (HSW)

Scratch-resistance is measured using a hand steel wool (HSW) test as defined in EP0614957.

The HSW test was implemented on the convex side of the lens only. Waiting time of 24 hours is respected to perform the test if an antireflection coating is deposited on the lens.

The lens was manually abraded with a steel wool folded on itself in the fibers direction performing 10 back and forth (with an amplitude of about 4 cm by 5 cm) keeping an index finger constant pressure on the steel wool. Especially, extra fine n° 000 STARWAX© steel wool having a size of 3 cm by 3 cm was used.

The lens was then rubbed with a dry cloth and rinsed with alcohol.

Strength pressed on the steel wool can be evaluated with a balance: fix the lens on the balance plate with adhesive tape and press down the lens with the index finger exercising normally strength on the lens. This strength is about 5 Kg during the first way and about 2.5 Kg during the return way.

Lenses were visually inspected and the state of the lens was then estimated and classified as follows:

0: no observed scratching,
1: lens very slightly scratched (0 to 5 scratches),
2: lens slightly scratched (up to 20 scratches),
3: lens somewhat scratched (up to 50 scratches),
4: lens very scratched (more than 50 scratches),
5: bare substrate.

The higher is the note, the more abraded is the lens.

f) Q-SUN

Q-SUN is performed in a xenon test chamber Q-SUN® Xe-3 from Q-LAB at a relative humidity of 20% (±5%) and at a temperature of 23° C. (±5° C.). The lens is introduced in the chamber and the tested side (generaly convexe siade) is exposed to the light. The lens is exposed to UV during 80 h and then subjected to the crosshatch test. According to crosshatch test ISTM 02-010, a mark from 0 to 5 is given to the lens. With mark 0 or 1, the lens is acceptable (passes), whereas marks 2 to 5 are not acceptable (does not pass).

2. Experimental Details 2.1 Example 1: Preparation of an Adhesion Promoter According to the Invention The aim of this example is to prepare an hyperbranched polyester having 2-bis(methylol)propionic acid (bis-MPA) branching units available under the trade name Boltorn H20® modified by 3-isocyanatopropyl triethoxysilane (IP-TEOS) to form silylated Boltorn H20®, hereafeter referred to H20-Si.

For that purpose, 5 g of Boltorn H20® (46 mmol of OH terminal groups) and 20 g of tetrahydrofuran (THF) were added in a 100 ml flask, the mixture was heated at 60° C. in order to make Boltorn H20® dissolved in THF. The solution was then cooled down to room temperature and 5.575 g of IPTEOS (26 mmol of isocyanate functional groups) was dripped slowly into the flask by a pressure-equalized addition funnel under vigourous stirring to keep the solution at low temperature. After the addition was finished, the solution was stirred continuously for about 20 min. 0.05 g of dibutyl tin dilaurate (DBTDL) was added into the solution. Then the solution was reacted at 60° C. for 3 hours. Solid H20-Si was obtained by precipitation in hexane and dried under vacuum at room temperature.

Thus, a polyester-based dendrimer with same number of silane and OH as terminal groups is obtained. Functionalization ratio is about 1.

2.2 Example 2: Preparation of 1.6 Refractive Index Hardcoats with 5% H20-Si

Two hard coat compositions with the adhesion promoter H20-Si of the invention (HI-F1 and HI-F2) and two comparative hard coat compositons without the H20-Si of the invention (Comparative Test 1 and Comparative test 2) were tested in the experimental essays.

The HI-F1 and HI-F2 hard coat compositions with a hight refractive index of the invention comprise, by weight relative to the total weight of the composition, 5% of H20-Si.

Another composition was prepared by mixing separately Boltorn H20® and IPTEOS directly in the hard coat solution but coating obtained were not satisfying as IPTEOS would react with water or silanols and would not act as coupling agent between dendrimer and sol-gel matrix.

The formulations of these compositions are listed in the table 1 below (ingredient in w %):

TABLE 1

| Component | HI-F1 | HI-F2 | Comparative Test 2 | Comparative Test 1 |
|---|---|---|---|---|
| H20-Si | 2.10 | 2.46 | 0.00 | 0.00 |
| Glymo | 19.20 | 26.04 | 31.37 | 21.87 |
| 0.1N HCl | 4.97 | 6.60 | 7.62 | 5.00 |
| Al(acac)3 | 0.66 | 0.92 | 0.90 | 1.50 |
| Surfactant | 0.07 (BYK 340) | 0.10 (BYK 340) | 0.09 (BYK 340) | 0.20 (EFKA-3034) |
| Colloid ESS-2 (JGC) (TiO2 in methanol, 20% wt) | 70.90 | 0.00 | 0.00 | 67.24 |
| Colloid 1120Z (20% wt in methanol) | 0.00 | 61.42 | 60.02 | 0.00 |

BYK340 (from BYK Chemie) and EFKA 3034 (from Ciba Specialty Chemicals) are wetting agents well known by the skilled artisan.

Since the adhesion and transmittance properties can be impacted by the preparation sequence, the process of prepartion of the hardcoat formulation according to the invention comprises the following successive steps:

1) Weigh H20-Si obtained according to the preparation method described in example 1 in bottle and dissolve it by methanol under stirring;

2) Drip 0.1 N HCl (by stoichiometry) into the bottle slowly and allow to stir for 30 minutes to hydrolysize;

3) Drip [gamma]-glycidoxypropyltrimethoxysilane (GLYMO®) into the bottle slowly to keep temperature <40° C. and and stir for 3 hours to achieve complete hydrolysis and mixing;

4) Add colloids in methanol (traded by JGC under the reference colloid ESS-2) into the mixture and stir it for 10 minutes;

5) Add aluminium acetylacetonate (Al(acac)$_3$) into the solution and stir for 10 minutes;

6) Add BYK 340 into the solution and stir for another 24 hours;

7) Store the formulation at −18° C. and condition it to 4° C. before use.

2.3 Example 3: Coating the Hard Coat Composition onto Acrylic Polymer-based Substrate Onto an Acrylic 1.6 substrate based on KOC 60S monomer mixture, the four formulations prepared at example 2 are deposited by spin-coating to achieve a monolayer dry coating with a thickness of about 3-4 μm. The thickness may be controlled by the spin coating speed. The hard coat layer is then cured at 70° C. during 20 min and followed by a post-curing at 105° C. for 5 hours.

Thus, two lenses comprising the hard coat monolayer of the invention, i.e.: HI-F1 and HI-F2 and two comparative lenses with a monolayer of a hard coat according to the prior art (i.e.: without the adhesion promoter of the invention) are obtained.

2.4 Example 4: Performance Test of the Hardcoat Solution on Acrylic 1.6

The results of performance test are shown in Table 2 below:

TABLE 2

|  | Performance test Lens | | | |
| --- | --- | --- | --- | --- |
| Hard coat formulations | HI-F1 | HI-F2 | Comparative Test 2 | Comparative Test 1 |
| Substrate (plano) | Acrylic | Acrylic | Acrylic | Acrylic |
| Colloid | ESS-2 | 1120Z | 1120Z | ESS-2 |
| Refractive index | 1.606 | 1.612 | 1.605 | 1.607 |
| Transmittance [%] | 88.8 | 88.5 | 88.8 | 88.9 |
| Yellow Index | 2.13 | 2.48 | 2.24 | 2.16 |
| Haze | 0.12 | 0.22 | 0.11 | 0.04 |
| Fringe | No | No | No | No |
| Sand Bayer | 3.09 | 3.21 | — | 3.32 |
| Dry cross hatch [class] | 0 | 0 | 5 | 0 |
| Cracks (after cure) | No | No | No | Yes |
| Steel wool | 3 | 3 | 1 | 1-3 |
| Qsun test (80 hrs) Front side | 0 | 0 | — | 0 |
| Back side | 0 | 0 | — | 0 |
| Thickness [μm] | 2.84 | 3.06 | 3.4 | 2.63 |

These experimental essays demonstrated that good adhesion and mechanical properties are obtained when the hard coat composition of the invention is applied onto acrylic substrates: no cracks were observed after curing and steel wool test of 3 is acceptable. In addition, no fringes appears on the lenses comprising the monoloyer hard coat of the invention.

On the contrary, comparative Test1 shows that after cure, cracks could be evidenced in the coating, indicating that adhesion is weak. This result is confirmed by the poor performance in Steel-Wool abrasion test. Comparative Test 2 shows poor adhesion in dry cross hatch test on acrylic 1.6 substrate when adhesion promoter H20-Si of the invention is absent from the formulation.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

The invention claimed is:

1. A sol-gel composition forming upon cure a coating for (meth)acrylic polymer-based substrates, the sol-gel composition comprising:
    (i) a hard coat solution comprising, by weight relative to its total weight:
    130 to 230 parts of a silane hydrolysate that is a hydrolysate of an epoxysilane of formula (V):

$$(R^1O)_3Si(CH_2)_a\text{---}(OCH_2CH_2)_b\text{---}OCH_2C\overset{R^2}{\underset{\diagdown O \diagup}{\text{---}}}CH_2, \quad (V)$$

wherein:
   $R^1$ is an alkyl group with 1 to 6 carbon atoms,
   $R^2$ is a methyl group or a hydrogen atom,
   a is a whole number from 1 to 6, and
   b is 0, 1 or 2,
   30 to 800 parts of colloid particles of inorganic oxide, and
   5 to 20 parts of an aluminum chelate that is a compound formed by reacting an aluminum alcoholate or acylate with at least one nitrogen-and sulphur-free sequestrating agent containing oxygen as the coordinating atom; and
   (ii) an adhesion promoter comprising a dendritic polymer having hydroxyl and alkoxysilane groups at terminal ends thereof,
   wherein:
   the dendritic polymer is a hyperbranched polymer or a dendrimer having:
   a degree of functionality in hydroxyl and alkoxysilane of from 5 to 60,
   a number average molar mass Mn ranging from 1000 to 15000g/mol, and
   a functionalization ratio hydroxyl/alkoxysilane ranging from 0.4 to 2.5;
   a content of the adhesion promoter is from 1 to 15% by weight, relative to a total weight of the sol-gel composition; and
   the coating for (meth)acrylic polymer-based substrates is an ophthalmic coating.

2. The sol-gel composition of claim 1, wherein said alkoxysilane groups at terminal ends of the dendritic polymer are obtained by grafting on the dendritic polymers with a coupling agent comprising an alkoxysilane having at least one functional group selected from the group consisting of isocyanate, carboxylic acid and carboxylic acid derivatives, and mixtures thereof.

3. The sol-gel composition of claim 1, comprising, by weight relative to its total weight:
   20 to 150 parts of a silane hydrolysate having formula (I):

$$Z^1\text{---}\underset{\underset{t^2}{|}}{\overset{\overset{t^1}{|}}{Si}}\text{---}Z^2, \quad (I)$$

wherein:
   $t^1$ and $t^2$ are groups which will each react to give a OH group on hydrolysis of the silane of formula (I),
   $Z^1$ and $Z^2$ are organic groups bonded to the silicon atom by a Si—C bond which do not contain a group capable of reacting with the hydrolyzed silanes present in the composition; and
   optionally a catalyst, colloidal particles, or both.

4. The sol-gel composition of claim 1, comprising from 2 to 10% by weight of said adhesion promoter relative to the total weight of the sol-gel composition.

5. An optical article having at least one surface comprising a coating obtained by directly depositing the sol-gel composition of claim 1 on substrate, then curing said sol-gel composition.

6. The optical article of claim 5, wherein the substrate is a (meth)acrylic substrate with a refractive index ranging from 1.55 to 1.65.

7. A process of preparation of an article as defined in claim 5, comprising:
preparing the hard coat solution;
preparing the adhesion promoter;
mixing the hard coat solution with the adhesion promoter so as to obtain the sol-gel composition;
coating the substrate with the sol-gel composition; and
curing the sol-gel composition.

8. The process of claim 7, wherein the preparation of the adhesion promoter comprises the successive following steps:
mixing at least one dendritic polymer having hydroxyl groups at terminal ends thereof in a solvent so as to obtain a mixture;
adding under stirring, to the above mixture, a coupling agent selected from alkoxysilanes;
optionally, adding to the mixture a catalyst; and
obtaining the adhesion promoter by precipitation and/or extraction.

9. The sol-gel composition of claim 4, comprising from 5 to 8% by weight of said adhesion promoter relative to the total weight of the sol-gel composition.

10. The sol-gel composition of claim 4, comprising 5% by weight of said adhesion promoter relative to the total weight of the sol-gel composition.

11. The sol-gel composition of claim 2, wherein the coupling agent comprises an alkoxysilane having at least one functional group which is a carboxylic acid derivative selected from the group consisting of a carboxylic chloride, a carboxylic bromide and a carboxylic anhydride.

12. The sol-gel composition of claim 1, wherein the dendritic polymer is a hyperbranched polymer or a dendrimer having a degree of functionality in hydroxyl and alkoxysilane of from 10 to 32.

13. The sol-gel composition of claim 1, wherein the dendritic polymer is a hyperbranched polymer or a dendrimer having a degree of functionality in hydroxyl and alkoxysilane of from 15 to 20.

14. The sol-gel composition of claim 1, wherein the dendritic polymer has a number average molar mass ranging from 2000 to 12000g/mol.

15. The sol-gel composition of claim 1, wherein the dendritic polymer has a number average molar mass ranging from 3000 to 5000g/mol.

16. The sol-gel composition of claim 1, wherein the dendritic polymer has a functionalization ratio hydroxyl/alkoxysilane ranging from 0.65 to 1.5.

17. The optical article of claim 5, further defined as an ophthalmic article.

18. The optical article of claim 5, wherein the substrate is a (meth)acrylic substrate.

19. The sol-gel composition of claim 1, wherein the dendritic polymer has a functionalization ratio hydroxyl/alkoxysilane ranging from 0.95 to 1.05.

20. The sol-gel composition of claim 1, wherein the dendritic polymer is a hyperbranched polymer or a dendrimer having a degree of functionality in hydroxyl and alkoxysilane of 16.

* * * * *